United States Patent
Walley et al.

(10) Patent No.: US 7,289,649 B1
(45) Date of Patent: Oct. 30, 2007

(54) FINGERPRINT IMAGER

(75) Inventors: Thomas Michael Walley, Loveland, CO (US); Brian James Misek, Fort Collins, CO (US); Mark Alan Anderson, Fort Collins, CO (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 394 days.

(21) Appl. No.: 09/637,520

(22) Filed: Aug. 10, 2000

(51) Int. Cl.
*G06K 9/00* (2006.01)

(52) U.S. Cl. .................. 382/124; 283/68; 340/5.53; 340/5.83

(58) Field of Classification Search ........ 382/124–127, 382/315, 115, 116, 218; 345/103, 104, 174–176, 345/173; 356/71; 283/68, 69; 250/208.1
See application file for complete search history.

(56) References Cited

U.S. PATENT DOCUMENTS

| | | | | |
|---|---|---|---|---|
| 4,047,154 A | * | 9/1977 | Vitols et al. ............... | 382/125 |
| 4,747,147 A | * | 5/1988 | Sparrow .................... | 382/125 |
| 4,784,484 A | * | 11/1988 | Jensen ........................ | 356/71 |
| 5,195,145 A | * | 3/1993 | Backus et al. ............. | 382/126 |
| 5,644,139 A | * | 7/1997 | Allen et al. ................ | 250/557 |
| 5,729,008 A | | 3/1998 | Blalock et al. .......... | 250/208.1 |
| 5,838,306 A | * | 11/1998 | O'Connor et al. ......... | 345/163 |
| 5,854,482 A | * | 12/1998 | Bidiville et al. ............ | 250/221 |
| 5,869,822 A | * | 2/1999 | Meadows et al. .......... | 235/380 |
| 5,920,384 A | * | 7/1999 | Borza ........................ | 356/71 |
| 6,002,815 A | * | 12/1999 | Immega et al. ............. | 382/312 |
| 6,052,475 A | * | 4/2000 | Upton ........................ | 382/125 |
| 6,097,035 A | * | 8/2000 | Belongie et al. ........... | 250/556 |
| 6,207,945 B1 | * | 3/2001 | Bohn et al. ............... | 250/208.1 |
| 6,249,360 B1 | * | 6/2001 | Pollard et al. ............... | 358/473 |
| 6,256,022 B1 | * | 7/2001 | Manaresi et al. ........... | 345/174 |
| 6,259,108 B1 | * | 7/2001 | Antonelli et al. ........... | 250/556 |
| 6,282,303 B1 | * | 8/2001 | Brownlee ................... | 382/124 |
| 6,289,114 B1 | * | 9/2001 | Mainguet .................... | 382/124 |
| 6,317,508 B1 | * | 11/2001 | Kramer et al. ............. | 382/124 |
| 6,333,989 B1 | * | 12/2001 | Borza ......................... | 382/124 |
| 6,337,918 B1 | * | 1/2002 | Holehan ..................... | 382/124 |
| 6,360,004 B1 | * | 3/2002 | Akizuki ...................... | 382/124 |
| 6,408,087 B1 | * | 6/2002 | Kramer ...................... | 382/124 |
| 6,643,389 B1 | * | 11/2003 | Raynal et al. .............. | 382/124 |
| 6,677,929 B2 | * | 1/2004 | Gordon et al. ............. | 345/156 |
| 6,886,104 B1 | * | 4/2005 | McClurg et al. ........... | 713/300 |
| 7,043,061 B2 | * | 5/2006 | Hamid et al. ............... | 382/124 |
| 7,099,496 B2 | * | 8/2006 | Benkley, III ............... | 382/124 |

(Continued)

FOREIGN PATENT DOCUMENTS

EP 0813164 A1 12/1997

(Continued)

*Primary Examiner*—Matthew C. Bella
*Assistant Examiner*—Sath V. Perungavoor

(57) ABSTRACT

A method and system of imaging an object. First, movement information of the object is determined by using a navigation sensor array and a navigation engine. Based on the movement information, an imaging sensor strobe signal is selectively asserted to control an imaging sensor array. In response to an asserted imaging sensor strobe signal, the imaging sensor array captures sub-images of the object. The imaging sensor array has a plurality of pixels for imaging a portion of the object at one time. The plurality of sub-images are captured successively by the imaging sensor array as the object moves with respect to the imaging sensor array. Then, a composite image of the object is generated based on the captured sub-images.

20 Claims, 6 Drawing Sheets

U.S. PATENT DOCUMENTS 7,116,805 B2 * 10/2006 Machida .................. 382/124
7,203,347 B2 *  4/2007 Hamid .................... 382/124

FOREIGN PATENT DOCUMENTS

| EP | 0923018 | 6/1999 |
| EP | 0923018 A2 | 6/1999 |
| WO | WO 86/06266 | 11/1986 |
| WO | WO 98/58342 | 12/1998 |
| WO | WO 99/35964 | 7/1999 |
| WO | WO 99/43258 | 9/1999 |

* cited by examiner

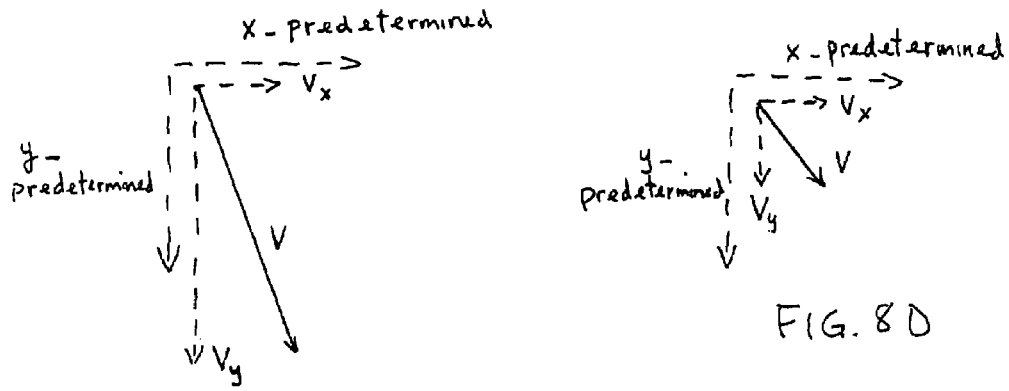
FIG. 8A
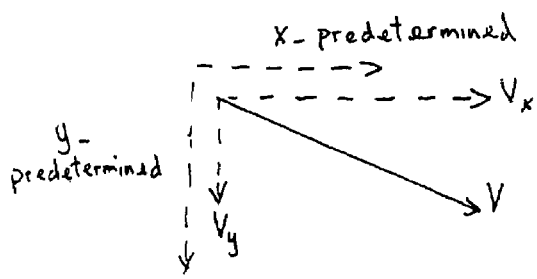
FIG. 8D
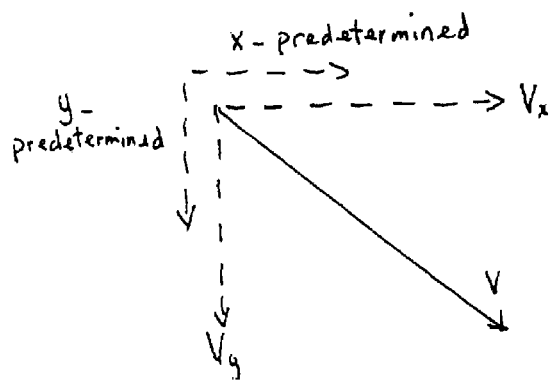
FIG. 8B
FIG. 8C

FINGERPRINT IMAGER

FIELD OF THE INVENTION

The present invention relates generally to imaging, and more specifically, to a fingerprint imaging method and system.

BACKGROUND OF THE INVENTION

Biometrics is the science of using unique personal and physical characteristics as a way to verify the claimed identity of a person. One of the oldest biometric sciences involves the use of fingerprints to identify a person. Since fingerprints are formed during fetal development, and are considered to remain unchanged throughout one's life, except for the rare cases where the fingerprint may change due to diseases or scars.

It is widely accepted that no fingers have identical prints, even from the same person or from identical twins. The systematic classification of fingerprints began in the 1800s and has been developed since that time through the extensive use of fingerprints by law enforcement and forensic societies.

In current usage, a fingerprint comparison is based on minutia (i.e., individual characteristics within the fingerprint pattern). For example, these minutia can include ridge endings and bifurcations in the fingerprint. The relative position of minutia is used for comparison, and according to empirical studies, two individuals typically will not have eight or more common minutia. A typical scan of a fingerprint contains 30-40 minutia.

Since fingerprints have a large amount of data, fingerprint biometrics have a high inherent accuracy that enables low rates of false acceptance (when a biometrics system wrongly verifies the identity of a person) and false rejection (when a biometrics system is unable to verify the legitimate claimed identity of a person).

In recent years, there has been much interest in developing fingerprint biometrics systems. For example, there are several commercially available fingerprint systems. One system is available from Veridicom of Santa Clara, Calif. A second system is available from IDEX AS of Heggedal, Norway.

An important aspect of any fingerprint biometrics system is the accurate capture of the fingerprint image. To ensure accurate capture, one approach taken by companies such as the Veridicom, is to have an array of sensors that covers the entire area of the fingerprint. One disadvantage of these full-array type of finger print imagers is that these imagers require a large sensor array to perform the image capture. This prior art fingerprint imager typically employs a sensor array whose area is commensurate with the area of the entire fingerprint. The large sensor array requires a sensor for each point of the fingerprint. For example, a standard sensor array has 400,000 sensors arranged as 500 pixels by 800 pixels so that the entire image of the fingerprint can be captured at one time.

It is well known that the cost of an integrated circuit is a function of the size or area of the integrated circuit. It would be desirable for there to be a mechanism to image a fingerprint by using an array of sensors that has fewer sensors than the number of sensors needed to cover the entire area of the finger print. By reducing the number of sensors needed to accurately capture the fingerprint image, the area of the integrated circuit can be decreased, thereby leading to cost savings. Unfortunately, the prior art approaches fail to provide such a mechanism.

A second approach followed by companies, such as IDEX AS of Heggedal, Norway, is to use a scan approach where a user is required to move his finger across an array or sensors that is substantially less than the total height of the finger. This approach is described in PCT patent application, International Publication Number WO 99/43258, entitled "Fingerprint Sensor." Unfortunately, this scan-type imager has several drawbacks. First, the IDEX approach uses a curved sensor and sliding assemblies (see FIGS. 2 to 5) to adapt to and to guide fingers of differing sizes. These grooves and curvatures and assemblies increase the complexity and attendant costs to manufacture the fingerprint sensor. Second, the U-shaped groove can be uncomfortable for some and difficult to use by others. It is would be desirable to have a scan-type fingerprint imager with relatively planar sensors and without the assemblies described above.

PCT patent application, International Publication Number WO 98/58342, entitled "Method and Apparatus for Measuring Structures in a Fingerprint," further describes a system in which a scan-type sensor can be utilized. This system employs a sensor array with two or more sensor lines in order to measure structures in the fingerprint smaller than the spacing of the sensors. Since this system uses two or more lines of sensors to image a single line of the fingerprint, the system must address the problem of combining these measurements of different lines into a single signal representing the single line in the fingerprint.

In order to combine these signals into a single signal, the patent application describes different correlation techniques that can be employed to combine signals measured from different lines of sensors. The system uses an adjustment scheme that corrects for the time delay between the signals from the sensors in different lines. Unfortunately, these techniques may increase the cost and complexity of the system. Consequently, it would be desirable to have a system that employs a single row of sensors that has comparable resolution and at the same time does not require complex signal correlation techniques.

Another problem faced by scan-type systems that are not encountered with full-array type sensor systems is that the movement of the finger needs to be determined. For example, to increase the accuracy of the captured image, the movement of the finger with respect to the sensor needs to be determined. Prior art systems perform this determination by using software executing on a host computer that is remote from the sensor. Unfortunately, the host computer solution may not adequately be able to handle the rate of data transfer between the sensor chip and the host computer unless a high-speed bus, which may be prohibitively expensive to implement, is utilized. Consequently, it is desirable for a system to have a single chip solution that has a sensor array and a mechanism for determining the movement of the finger.

Based on the foregoing, there remains a need for an apparatus and method for capturing an image of a finger print that employs a single sensor chip having an integrated navigation engine for determining the change in position of the finger with respect to time.

SUMMARY OF THE INVENTION

A method and system of imaging an object. First, movement information of the object is determined by using a navigation sensor array and a navigation engine. Based on the movement information, an imaging sensor strobe signal is selectively asserted to control an imaging sensor array. In response to an asserted imaging sensor strobe signal, the imaging sensor array captures sub-images of the object. The imaging sensor array has a plurality of pixels for imaging a portion of the object at one time. The plurality of sub-images is captured successively by the imaging sensor array as the object moves with respect to the imaging sensor array. Then, a composite image of the object is generated based on the captured sub-images.

BRIEF DESCRIPTION OF THE DRAWINGS

The present invention is illustrated by way of example, and not by way of limitation, in the figures of the accompanying drawings and in which like reference numerals refer to similar elements.

FIGS. 8(a), 8(b), 8(c) and 8(d) illustrate how fingerprint imager of the present invention determines whether a finger has moved a predetermined distance in a first direction or a predetermined distance in a second direction in accordance with a one embodiment of the present invention.

DETAILED DESCRIPTION OF THE PREFERRED EMBODIMENT

A method and apparatus for imaging a fingerprint are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

One novel aspect of the present invention, is the use of an imaging array that captures sub-images or portions of the object to be imaged (e.g., a fingerprint) at one time and a mechanism for generating a composite image of the object (e.g., a fingerprint) by using the captured sub-images.

Figure 6:
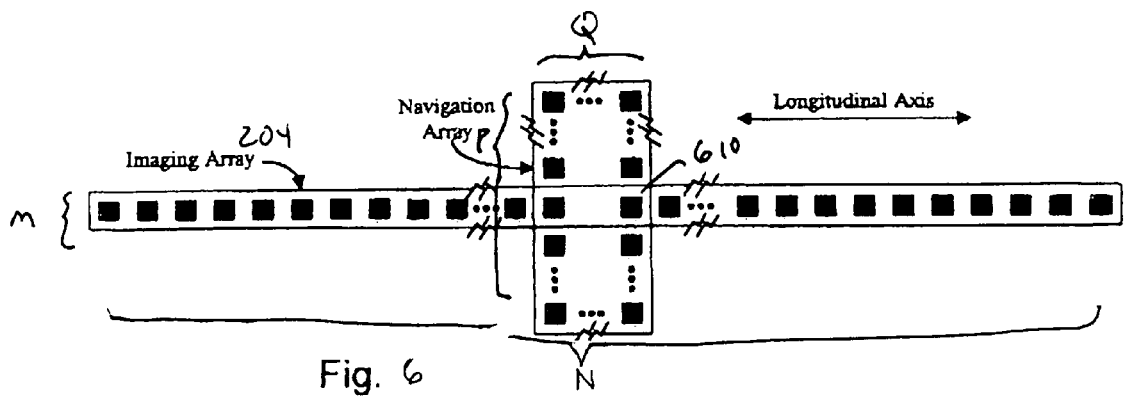
FIG. 6 illustrates one embodiment of the imager of the present invention in which the ISA and the NSA can be configured to share at least one sensor.

Referring to FIG. 6, an exemplary fingerprint imager with an imaging sensor array (ISA) 204 configured in accordance with one embodiment of the present invention. In this embodiment, the imaging sensor array (ISA) 204 includes a single row of sensors. As can be appreciated, the fingerprint imager utilizes much fewer sensors, thereby substantially decreasing the cost to manufacture the fingerprint imager integrated circuit.

It is noted that the ISA 204 can be configured in alternative arrangements. For example, instead of a single row or sensors, a predetermined number (M) of rows of sensors can be employed. Furthermore, if the fingerprint imager is configured for capturing fingerprints when a finger is swiped in a generally left-to-right motion, one or more columns of sensors can be utilized. It is noted that the number of sensors and the orientation of those sensors can be adjusted to suit the requirements of a particular application. These alternative arrangements are described in greater detail with reference to FIGS. 6 and 7.

Figure 4A:
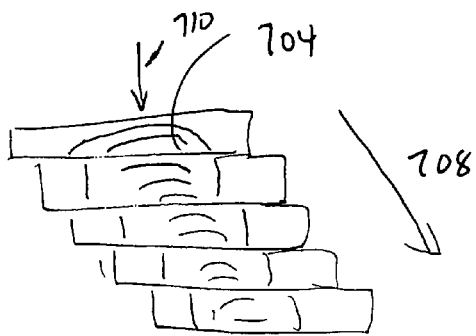
FIGS. 4(a) and 4(b) illustrate exemplary captured and corrected fingerprint images, respectively.
Figure 4B:
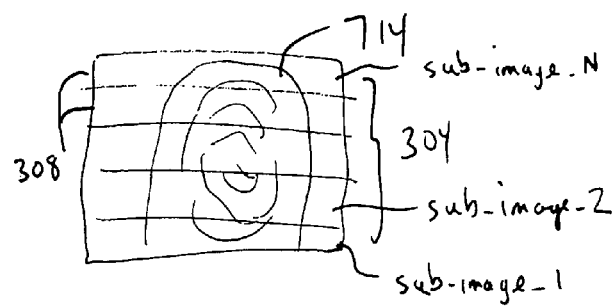

Referring to FIG. 4(b), an exemplary fingerprint image 304 and how sub-images or portions 308 of the fingerprint are successively captured by the fingerprint imager of the present invention.

In operation, a user positions the user's finger on an imaging surface and pulls or rolls the finger across the imaging surface in a direction of movement. The imaging surface can be a physical surface, such as a glass plane, or an optical imaging plane. It is noted that the teachings of the present invention can be applied equally to any type of imaging sensor, such as the optical type sensors, resistive-type sensors, and capacitive type sensors.

As described in greater detail hereinafter, the actual direction of movement can be represented by a vector of movement that can be decomposed into a first component in a first direction (e.g., a change in the x direction) and a second component in a second direction (e.g., a change in the y direction).

It is noted that in this embodiment, the finger is moved in a generally downward vertical direction. Each sub-image or stripe (1 to N) is captured successively as the finger moves in the generally downward vertical direction as indicated by the arrow. The sub-images are subsequently connected to form a composite image of the fingerprint.

Fingerprint Imager 400

Figures 1A, 1B:
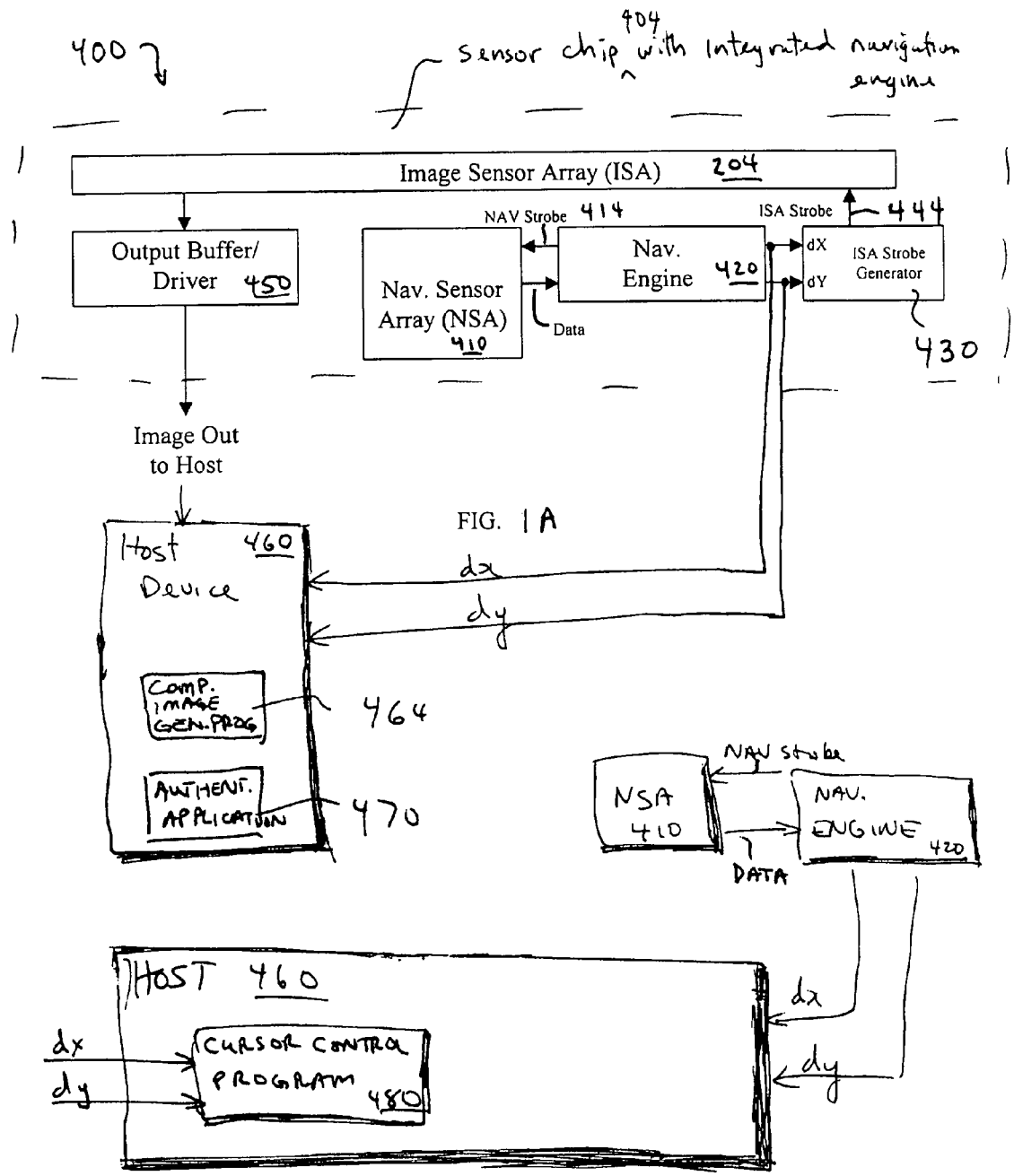
FIG. 1(a) is a block diagram of the fingerprint imager configured in accordance with one embodiment of the present invention for an imaging application.
FIG. 1(b) is a block diagram of the fingerprint imager configured in accordance with an alternative embodiment of the present invention for a cursor control application.

FIG. 1(a) is a block diagram of the fingerprint imager 400 configured in accordance with one embodiment of the present invention. The fingerprint imager 400 includes a sensor integrated circuit 404 (hereinafter referred to a sensor chip) that is described in greater detail hereinafter and a host device 460 (e.g., a host personal computer (PC)) coupled thereto. As described in greater detail hereinafter, the sensor chip 404 can be configured to implement different applications by using different software applications executing on the host PC 460.

One aspect of the present invention is the provision of a sensor chip 404 having an integrated navigation engine 420 for determining the change of position (e.g., a change in the x direction and a change in the y direction) of the finger. By integrating the navigation engine 420 into the sensor chip and providing a single chip solution, the present invention increases the processing speed, as compared to using software on the host for similar calculations, decreases costs, and obviates the need for a high speed bus or connection between the host 460 and the sensor chip 404.

The sensor chip 404 includes an image sensor array (ISA) 204 for imaging a portion of the fingerprint at one time and a navigation sensor array (NSA) 410 for capturing a navigation image of the fingerprint in response to an asserted navigation sensor array (NSA) strobe signal 414. The rate of the NSA strobe signal 414 can be predetermined and is preferably in the range of 1500 to 2000 frames per second.

It is noted that the rate of the NSA strobe signal 414 can be varied to suit a particular application.

In one embodiment, the navigation sensor array (NSA) 410 has a plurality of pixels arranged in a square area (e.g., an array of sensors arranged in a square area having about 20 sensors by about 20 sensors). It is noted that the pixels in the NSA 410 can be arranged in an area with other geometric shapes, such as a generally rectangular shape, a generally circular shape or generally elliptical shape. The number of pixels in the NSA 410 and the specific arrangement of the pixels in the NSA 410 can be varied to suit a particular application.

As noted previously, the fingerprint imager 400 also includes a navigation engine 420 for selectively asserting the navigation sensor array (NSA) strobe signal, receiving the navigation image from the NSA 410, and responsive thereto for generating movement information. The navigation engine 420 determines when an object to be imaged (e.g., a fingerprint) has moved a predetermined unit distance with respect to the NSA 410. The unit distance can vary across applications and be expressed in terms of resolution, such as, one pixel, ½ of a pixel, 1/10 of a pixel, etc. The navigation engine 420 causes the rate at which the ISA 204 captures images of the object to depend on the speed of movement of the object to be imaged.

U.S. Pat. No. 5,729,008, entitled "Method and Device for Tracking Relative Movement by Correlating Signals from an Array of Photoelements," which is incorporated by reference herein, describes in greater detail the operation and an exemplary implementation of the navigation engine 420 and the NSA 410.

The prior art solutions are limited to a constant predetermined rate of image capture, which as described earlier, causes a greater likelihood of errors in the resulting image. In contrast, the present invention captures images of the object at a varying rate based on the velocity of the moving object (e.g., the finger) to provide evenly spaced sub-images. These sub-images can then be assembled into the composite image by using software that is well known by those of ordinary skill in the art.

The fingerprint imager 400 also includes the imaging sensor array (ISA) 204 for capturing a portion of an image of the fingerprint in response to an asserted imaging sensor array (ISA) strobe signal 444. In one embodiment, the imaging sensor array (ISA) 440 includes a 1 by about 350 sensors. The number of pixels utilized can be varied to suit a particular application and to achieve a desired resolution. For example, if 500 dots per inch (dpi) is desired, and the object to image is a finger, which has a width generally of about 0.75 inches, about 350 to about 400 are needed to provide such a resolution. It is noted that the size of the sensors utilized in the ISA 204 can be the same pixel size or of a different pixel size than those sensors utilized in the NSA 410.

FIG. 6 illustrates a first arrangement or placement of the ISA 204 with respect to the NSA 410. It is noted that the ISA 204 can be an M×N array of sensors that preferably is a 1×N, where N is about 350 to about 400 for a resolution of 500 dpi. Also, NSA 410 can be a P×Q array of sensors. For example, the NSA 410 in a preferred embodiment is a 20 by 20 sensor array. It is noted that the ISA 204 and the NSA 410 share at least one common pixel or sensor (e.g., sensor 610). The common pixels or shared pixels perform the dual function of capturing the sub-images for the ISA 204 and also capturing images for the NSA 410.

When the NSA 410 and ISA 204 are configured in accordance to the first embodiment of the present invention, it is preferable that the sensors employed by the NSA 410 and the ISA 204 have the same dimensions or pitch density. For example, all the sensors can have dimensions of 50 microns by 50 microns. This first embodiment that has the sensor-sharing configuration has the advantage of further reducing the cost of manufacturing the fingerprint imager of the present invention by reducing the number of sensors needed to implement the imager.

Figure 7:
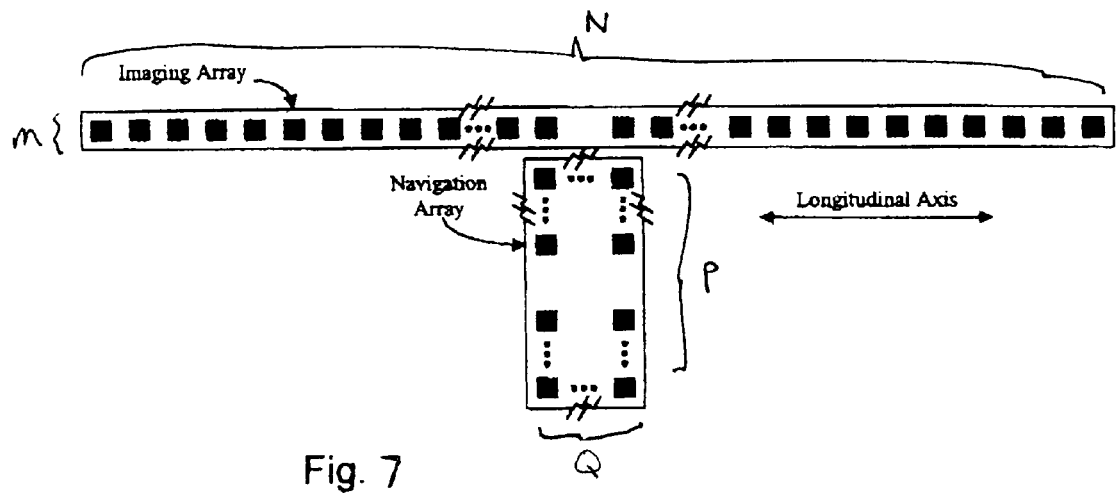
FIG. 7 illustrates an alternative embodiment of the imager of the present invention in which the ISA and the NSA are configured so that they do not share any sensors.

FIG. 7 illustrates an alternative arrangement or placement of the ISA 204 with respect to the NSA 410. It is noted that the ISA 204 is arranged to be separate from the NSA 410, and no sensors or pixels are shared therebetween.

When the NSA 410 and ISA 204 are configured in accordance to the second embodiment of the present invention, the dimensions of the sensors in NSA 410 and ISA 204 can be of different dimensions or pitch densities. In particular, it may be preferable for certain applications to have the sensors of the NSA 410 with dimensions small than the sensors of the ISA 204 in order for the NSA 410 to have better resolution than the ISA 204. For example, the sensors for the ISA 204 can have dimensions of 50 microns by 50 microns, whereas the sensors for the NSA 410 can have dimensions of 20 microns by 20 microns.

The fingerprint imager 400 also includes an ISA controller 430 for receiving the movement information from the navigation engine 420, and responsive thereto for selectively asserting the ISA strobe signal. As noted previously, an asserted ISA strobe signal causes the ISA 204 to image a portion of the fingerprint (i.e., capture a portion of the fingerprint image).

Authentication Application

The host 460 can include a composite image generation program 464 that receives the scans or sub-images, and the displacement of each sub-image with respect to a previous sub-image, and based thereon generates a composite image of the fingerprint that is corrected for skew due to uneven movement or "roll" of the finger as it moves with respect to the ISA 204. The host 460 can also include an authentication application 470 that extracts minutia information from the fingerprint image, compares the minutia information with previously-stored minutia information, and grants access to a resource (e.g., a computer system or a file) if there is a match between the minutia of the scanned fingerprint and one of the previously-stored minutia.

Cursor Control Application

FIG. 1(*b*) illustrates an alternative embodiment where the imager of the present invention is utilized to implement a cursor control application. In this application, the ISA 204 and ISA strobe generator 430 are not needed. The host 460 can include a cursor control application 480 that ignores the scans or sub-images generated by the ISA 204 and uses only the movement information generated by the navigation engine 420 to control the cursor. In this application, the NSA 410 serves to function as a mini-touch pad, and the navigation engine 420 is utilized to determine a desired movement of a cursor.

Figure 2:
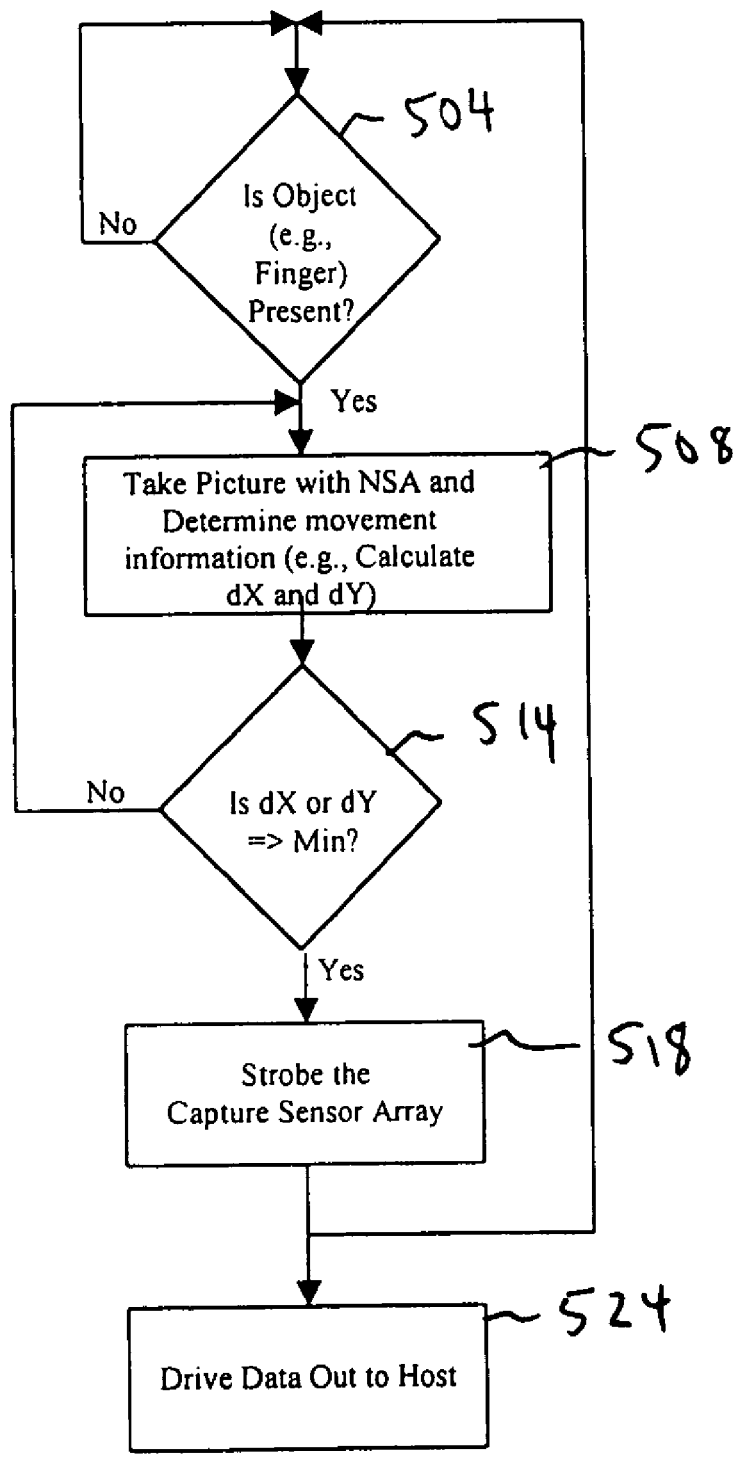
FIG. 2 is a flow chart illustrating the steps performed by fingerprint imager of FIG. 4.

FIG. 2 is a flow chart illustrating the steps performed by the imager of FIG. 1. To use the imager, a user positions his finger on a surface and moves the finger along the surface in a first direction. In step 504, a determination is made whether the object (e.g., the fingerprint) is present. This determination can be made by using contacts to sense the resistance between two points on the skin. Alternatively, when the sensors of the NSA 410 or the ISA 420 are of the capacitive type, these NSA 410 or the ISA 420 can be actively driven to continuously scan the sensors' surface and determine if a sensed signal meets a predetermined threshold. Similarly, a lens or optical system can be utilized to determine the presence of an object.

If an object to be imaged is not detected, step 504 is repeated until an object is detected. If an object to be imaged is detected, in step 508 a navigation image is captured of the object. Based on the navigation image and previously captured navigation images, movement information of the object is determined. For example, as described in greater detail hereinafter, the change in x-position and y-position of the object can be determined by the navigation images.

In step 514, a determination is made whether the movement or change of position is in a first predetermined relationship with predefined criteria. The change in position can be determine with respect to a current image provided by the NSA 410 and a previously captured image (e.g., an immediately preceding image). If the movement or change of position is in a first predetermined relationship with predefined criteria, then in step 518 an imaging sensor array strobe signal is asserted, and a sub-image of the object is captured (e.g., one of the stripes shown in FIG. 4(b)). Processing can then continue concurrently at steps 504 and 524.

In one embodiment, step 514 determines whether the change in x position is greater than or equal to a unit distance in a first direction (e.g., predetermined delta x) or whether the change in y position is greater than or equal to a unit distance in a second direction (e.g., predetermined delta y). If so, then the ISA strobe signal is asserted to capture a sub-image of the object. Otherwise, no sub-image is captured.

For example, the ISA strobe generator 430 can use the value of movement in a first direction and the value of movement in a second direction to determine if the finger has moved a predetermined unit distance in either direction. If it is determined that the finger has moved a predetermined distance in either direction, then the ISA strobe generator 430 asserts an ISA strobe 444 that selectively controls the ISA 204 to image a portion of the fingerprint. If it is determined that the finger has not moved a predetermined distance in either direction, then the ISA strobe generator 430 does not assert the ISA strobe signal 444 and the ISA 204 does not image a portion of the fingerprint.

If the movement or change of position is not in a first predetermined relationship with predefined criteria, then processing continues at step 508. Steps 508 and 514 are repeated until the movement or change of position is in the first predetermined relationship with the predefined criteria. In step 524, the sub-images captured in step 518 are provided to a host device, such as a personal computer (PC).

Figure 3:
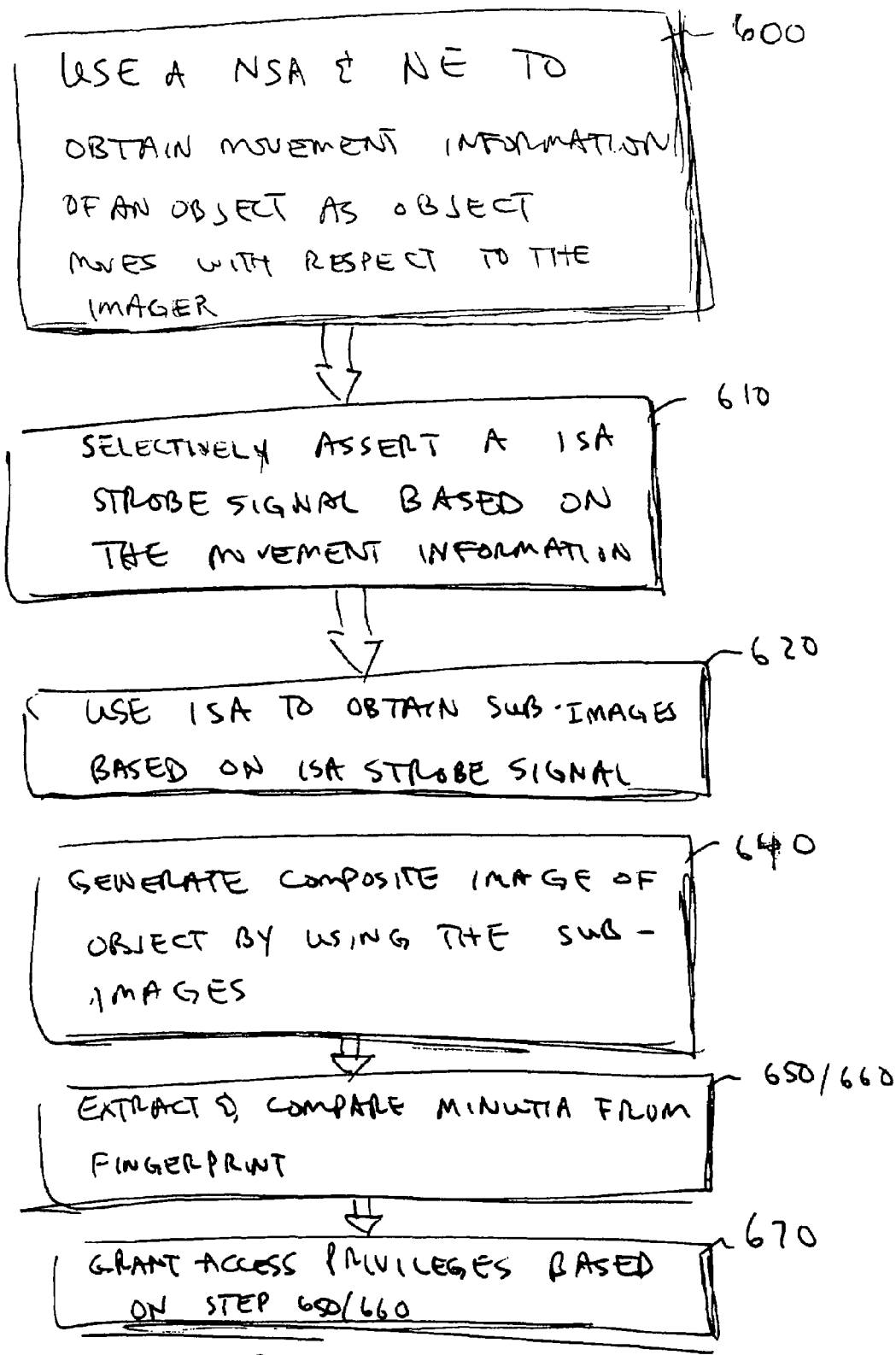
FIG. 3 is a flow chart illustrating a method of imaging an object in accordance with one embodiment of the present invention.

FIG. 3 is a flow chart illustrating a method for capturing an image of an object in accordance with one embodiment of the present invention. In step 600, a navigation sensor array and navigation engine are utilized to obtain movement information of an object that is moving with respect to the imager. In step 610, an imaging sensor array strobe signal is selectively asserted based on the movement information. In step 620, an imaging sensor array is utilized to obtain a sub-image or portion of the object in response to the asserted ISA strobe signal. In step 630, the sub-images are provided to a host device, such as a personal computer (PC). In step 640, a composite image of the object is generated in the host based on the captured sub-images.

In step 650, minutia features are extracted from the object, when the object is a fingerprint. In step 660, the minutia features are compared with previously stored minutia features. In step 670, the comparison of step 660 is utilized to determine whether to grant access privileges to a device, file, network etc. or to otherwise authenticate a user's identity.

FIGS. 4(a) and 4(b) illustrate exemplary captured fingerprint images and corrected fingerprint images, respectively. FIG. 4(a) illustrates a first exemplary fingerprint image 704 captured by the fingerprint imager of the present invention when a finger is moved generally in a direction 708 shown. It is noted that the preferred direction of movement is a generally vertical direction 710. The image 704 has a skewed trapezoid-like appearance, which is corrected by correction software that resides in the host computer 460.

The correction software uses the movement information (e.g., x and y information) provided by the navigation engine 420 to correct for the skew in the image and generate a composite image where the sub-images are generally stacked evenly one on top the other. For example, the x offset and the y offset of each scan or sub-image with respect to a previous scan or sub-image is utilized to correct for any skew introduced by the movement of the finger. In this manner, each scan or sub-image is stacked upon the previous scan or sub-image to generate images that are generally upright and have a rectangular appearance instead of a trapezoidal appearance. FIG. 4(b) illustrates the corrected fingerprint image 714 corresponding to the skewed image 704.

Figure 5A:
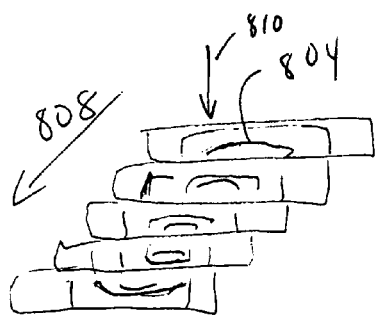
FIGS. 5(a) and 5(b) illustrate exemplary captured and corrected fingerprint images, respectively.
Figure 5B:

FIGS. 5(a) and 5(b) illustrate exemplary captured fingerprint images and corrected fingerprint images, respectively. FIG. 4(a) illustrates a first exemplary fingerprint image 804 captured by the fingerprint imager of the present invention when a finger is moved generally in a direction 808 shown. It is noted that the preferred direction of movement is a generally vertical direction 810. The image 804 has a skewed trapezoid-like appearance, which is corrected by correction software that resides in the host computer 460. FIG. 4(b) illustrates the corrected fingerprint image 814 corresponding to the skewed image 704.

FIGS. 8(a), 8(b), 8(c) and 8(d) illustrate how fingerprint imager of the present invention determines whether a finger has moved a predetermined distance in a first direction or a predetermined distance in a second direction in accordance with a one embodiment of the present invention. In one embodiment, step 514 includes the following sub-steps. First, a first navigation image corresponding to a first time is captured. Second, a second navigation image corresponding to a second time is captured. Third, the first and second navigation images are compared to derive movement information. The movement information can be represented by a vector that has both a magnitude and direction.

For example, referring to FIG. 8a, the movement vector can point in a generally southeast direction. The movement vector can be divided into a horizontal or x component and a vertical or y component. The change in the x position (delta x) is compared to a predetermined x unit value (e.g., one pixel). Similarly, the change in the y position (delta y) is compared to a predetermined y unit value (e.g., one pixel). If the measured change in x position is greater than or equal to the predetermined unit values in the x direction or if the measured change in y position is greater than or equal to the predetermined unit values in the y direction, an ISA strobe signal is asserted.

FIG. 8a illustrates the case where the x component is less than the predetermined x unit value, but the y component is greater than or equal to the predetermined y unit value. FIG. 8b illustrates the case where the x component is greater than or equal to the predetermined y unit value and where the y component less than the predetermined y unit value. FIG. 8c illustrates the case where the x component is greater than or equal to the predetermined x unit value and where the y component is greater than or equal to the predetermined y unit value. FIG. 8a illustrates the case where both the x component and the y component are less than the predetermined x and y unit values, respectively. It is noted that in the case illustrated in FIGS. 8a-8c, the ISA strobe signal is asserted.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A fingerprint imager for capturing an image of a fingerprint comprising:

a single sensor integrated circuit having an imaging array having a plurality of sensors arranged along an x-axis for capturing a sub-image of the fingerprint at one time wherein the fingerprint is moved with respect to the imaging array in a direction that is generally perpendicular to the x-axis; and a mechanism for determining a change in the position of the fingerprint with respect to time and controlling the image capture of the imaging array that includes a navigation array having a plurality of sensors for capturing navigation images of a portion of the fingerprint as the fingerprint moves with respect to the navigation array; and a navigation engine, coupled to the navigation array, the navigation engine configured for controlling when the imaging array captures sub-images, and further configured for receiving the navigation images and based thereon for determining a delta x, which is then compared to a predetermined x unit value for determining the amount of movement of a fingerprint generally along the x-axis and for determining a delta y, which is then compared to a predetermined y unit value for determining the amount of movement of a fingerprint along a y-axis that is generally perpendicular to the x-axis, wherein the navigation engine directs the rate at which the imaging array captures sub-images of the fingerprint in response to the rate of movement of the fingerprint.

2. The fingerprint imager of claim 1 wherein the predetermined x unit value is equal to one pixel.

3. The fingerprint imager of claim 1 wherein the imaging array is separate from the navigation array.

4. The fingerprint imager of claim 1 wherein the plurality of sensors of the imaging array is one of resistive-type sensors, capacitive type sensors, and optical-type sensors; and wherein the plurality of sensors of the navigation array is one of resistive-type sensors, capacitive type sensors, and optical-type sensors.

5. The fingerprint imager of claim 1 wherein the fingerprint imager includes a surface along which a finger is moved and wherein the fingerprint imager is implemented in a stand-alone unit comprising:

a) optics for focusing light onto the surface; and b) optics assembly for housing the optics.

6. The fingerprint imager of claim 1 wherein the fingerprint imager includes a surface along which a finger is moved and wherein the fingerprint imager is implemented in a personal computer (PC) peripheral comprising:

a) optics for focusing light onto the surface; and b) optics assembly for housing the optics.

7. The fingerprint imager of claim 6 wherein the PC peripheral device is one of a cursor pointing device and a keyboard.

8. The fingerprint imager of claim 1 wherein the fingerprint imager includes a surface along which a finger is moved and wherein the surface is one of a physical surface and an optical imaging plane.

9. The fingerprint imager of claim 1 wherein the pixel size of the sensors of the imaging array is different from the pixel size of the sensors in the navigation array.

10. The fingerprint imager of claim 9 wherein the pixel size of the sensors of the imaging array has the dimensions of about 50 microns by about 50 microns and the pixel size of the sensors in the navigation array has the dimensions of about 20 microns by about 20 microns.

11. The fingerprint imager of claim 1 wherein the resolution of the sensors of imaging array and the sensors of the navigation array is about 500 dots per inch.

12. The fingerprint imager of claim 1 wherein the fingerprint imager is implemented in a stand-alone unit and wherein the fingerprint imager further comprises:

a) a capacitive sensor having a surface along which a finger is moved; and b) an assembly for housing the capacitive sensor.

13. The fingerprint imager of claim 1 wherein the fingerprint imager is implemented in a personal computer (PC) peripheral and wherein the fingerprint imager further comprises:

a) a capacitive sensor having a surface along which a finger is moved; and b) an assembly for housing the capacitive sensor.

14. The fingerprint imager of claim 1 further comprising:

a) an imaging array strobe generator for employing the change in position to selectively control when the imaging array captures the sub-images; and b) a processor;

c) a composite image generation software which when executing on the processor receives the sub-images and the movement information for each sub-image relative to a previous sub-image and based thereon generates a composite image of the fingerprint; and d) an identification software which when executing on the processor receives the composite image of the fingerprint, analyzes the composite image to generate minutia, and compares the generated minutia to previously stored minutia, and grants access to a resource if the generated minutia matches one of the previously stored minutia.

15. The fingerprint imager of claim 1 further comprising:

a) a processor; and b) a cursor control software which when executing on the processor receives the movement information of the fingerprint along at least one of the x-axis and the y-axis from the navigation engine and uses the movement information to control a cursor.

16. The fingerprint imager of claim 1 wherein the imaging array is a 1×N sensor array.

17. The fingerprint imager of claim 1 wherein the navigation array is a P by Q sensor array.

18. A method of operating a fingerprint imager having an imaging array and a navigation array, the method comprising:
- capturing with the navigation array a first navigation image at a first instant;
- capturing with the navigation array a second navigation image at a second instant, the second instant being different than the first instant;
- defining a movement vector having an x-component and a y-component;
- defining a predetermined x unit value;
- defining a predetermined y unit value;
- generating a delta x and a delta y of the movement vector from the first and second navigation images;
- comparing the delta x to the predetermined x unit value;
- comparing the delta y to the predetermined y unit value; and
- generating a strobe signal when at least one of the delta x and the delta y is greater than the predetermined x and y unit values respectively, wherein the strobe signal directs the rate at which an imaging array captures sub-images of the fingerprint in response to the rate of movement of the fingerprint.

19. The method of claim 18, wherein the predetermined x unit value is defined as one pixel.

20. The method of claim 18, wherein the predetermined y unit value is defined as one pixel.

* * * * *